(12) United States Patent
Baek et al.

(10) Patent No.: US 10,813,166 B2
(45) Date of Patent: Oct. 20, 2020

(54) METHOD AND DEVICE FOR GROUP COMMUNICATION

(71) Applicant: Samsung Electronics Co., Ltd., Suwon-si, Gyeonggi-do (KR)

(72) Inventors: Yun-Sun Baek, Suwon-si (KR); Jeong-Wun Jee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 12 days.

(21) Appl. No.: 15/772,485

(22) PCT Filed: Oct. 28, 2016

(86) PCT No.: PCT/KR2016/012263
§ 371 (c)(1),
(2) Date: Apr. 30, 2018

(87) PCT Pub. No.: WO2017/074106
PCT Pub. Date: May 4, 2017

(65) Prior Publication Data
US 2018/0324895 A1 Nov. 8, 2018

(30) Foreign Application Priority Data

Oct. 30, 2015 (KR) .................. 10-2015-0152232

(51) Int. Cl.
*H04L 12/16* (2006.01)
*H04Q 11/00* (2006.01)
(Continued)

(52) U.S. Cl.
CPC ......... *H04W 76/45* (2018.02); *H04L 65/4061* (2013.01); *H04W 4/023* (2013.01);
(Continued)

(58) Field of Classification Search
CPC ....... H04W 76/45; H04W 4/02; H04W 4/023; H04W 4/08; H04W 4/10; H04W 76/00; H04W 8/186
See application file for complete search history.

(56) References Cited

U.S. PATENT DOCUMENTS 5,491,835 A * 2/1996 Sasuta ................. H04W 4/10
455/509
2003/0186716 A1* 10/2003 Dorenbosch ........ H04W 72/005
455/519

(Continued)

FOREIGN PATENT DOCUMENTS

| EP | 1638249 A1 | 3/2006 |
|---|---|---|
| KR | 10-2006-0010609 A | 2/2006 |
| WO | 2015147671 A1 | 10/2015 |

OTHER PUBLICATIONS

ISA/KR, "International Search Report and Written Opinion of the International Searching Authority," International Application No. PCT/KR2016/012263, dated Jan. 25, 2017, 12 pages.

*Primary Examiner* — Stephen M D Agosta

(57) ABSTRACT

The present disclosure relates to technologies for sensor networks, machine-to-machine (M2M) communications, machine-type communications (MTC), and the Internet of Things (IoT). The present disclosure may be applied to intelligent services such as smart homes, smart buildings, smart cities, smart cars or connected cars, health care, digital education, retail businesses, and security and safety related services, on the basis of said technologies. More specifically, the present disclosure relates to a method for performing a group communication by a terminal, the method comprising the steps of: setting a condition for selecting target terminals which will perform a group communication on the basis of the position of the terminal, and transmitting, to a server for providing the group communication, configuration informa- (Continued)

tion including the set selection condition; transmitting, to the server, a request for the group communication; receiving, from the server, a talk burst control message for a group communication with terminals which satisfy the selection condition and are selected from adjacent terminals positioned in the near field of the terminal; and relaying and transmitting media data to the selected terminals via the server.

4 Claims, 10 Drawing Sheets

(51) Int. Cl.
| | | |
|---|---|---|
| *H04W 76/45* | (2018.01) | |
| *H04W 4/029* | (2018.01) | |
| *H04W 4/08* | (2009.01) | |
| *H04W 76/00* | (2018.01) | |
| *H04L 29/06* | (2006.01) | |
| *H04W 4/02* | (2018.01) | |
| *H04W 4/10* | (2009.01) | |
| *H04L 29/08* | (2006.01) | |
| *H04W 8/18* | (2009.01) | |
| *H04W 4/70* | (2018.01) | |
| *H04W 84/18* | (2009.01) | |

(52) U.S. Cl.
CPC .............. *H04W 4/029* (2018.02); *H04W 4/08* (2013.01); *H04W 4/10* (2013.01); *H04W 76/00* (2013.01); *H04L 67/12* (2013.01); *H04W 4/70* (2018.02); *H04W 8/186* (2013.01); *H04W 84/18* (2013.01)

(56) References Cited

U.S. PATENT DOCUMENTS

| | | | |
|---|---|---|---|
| 2005/0124365 A1 | 6/2005 | Balasuriya et al. | |
| 2005/0176454 A1 | 8/2005 | Chakraborty et al. | |
| 2006/0025168 A1 | 2/2006 | Lee et al. | |
| 2008/0004038 A1 | 1/2008 | Dunko | |
| 2009/0161609 A1* | 6/2009 | Bergstrom | H04W 76/20 370/329 |
| 2010/0159976 A1 | 6/2010 | Marocchi et al. | |
| 2012/0122510 A1 | 5/2012 | Mistro | |
| 2013/0129060 A1* | 5/2013 | Gopalakrishnan | G06Q 30/02 379/93.01 |
| 2014/0057645 A1* | 2/2014 | Chowdhary | H04W 4/08 455/456.1 |
| 2015/0194987 A1* | 7/2015 | Li | H04L 1/0057 714/752 |

\* cited by examiner

METHOD AND DEVICE FOR GROUP COMMUNICATION

CROSS-REFERENCE TO RELATED APPLICATIONS AND CLAIM OF PRIORITY

This application is a National Phase Entry of PCT International Application No. PCT/KR2016/012263, which was filed on Oct. 28, 2016 and claims priority under 35 U.S.C. § 119 of Korean Patent Application No. 10-2015-0152232, which was filed in the Korean Intellectual Property Office on Oct. 30, 2015, the entire disclosure of each of these applications is incorporated herein by reference.

TECHNICAL FIELD

The present disclosure relates to the generation and release of a group for group communication based on the position of a user.

BACKGROUND ART

The Internet has evolved from a human-centered connection network in which humans may create and consume information, into an Internet of Things (IoT) network in which distributed components, such as objects, may exchange and process information. For example, in the Internet of Everything (IoE) technology, big data processing technology is combined with IoT through connection with a cloud server and the like.

As technological elements, such as sensing technology, wired/wireless communication and network infrastructure, service interface technology, and security technology, are required to implement IoT, technologies for sensor networks, Machine-To-Machine (M2M) communication, and Machine-Type Communication (MTC) have been studied for connection between objects.

In an IoT environment, an intelligent Internet Technology (IT) service may be provided that collects and analyzes data generated from connected objects to create new value in human life. The IoT will be applied to the fields of a smart home, a smart building, a smart city, a smart car or connected car, a smart grid, health care, a smart home appliance, advanced medical care services, and the like through convergence and integration of existing IT technology with various industries.

As Voice over Internet Protocol (VoIP) services are expanded with the extension of Internet Protocol (IP)-based network infrastructure for IoT implementation and users' demands, mobile network carriers, mobile phone manufacturers, and VoIP solution providers continue to provide data packet-based communication services, such as VOIP services, in an extended manner.

Push-To-Talk (PIT), which is one of various communication services based on VoIP, is a service in which each individual cellular phone or smartphone is assigned a unique IP and makes a one-to-one or one-to-many call using VoIP, even without using a mobile communication network, like a walkie-talkie. That is, PTT is a service that allows a plurality of users to listen to a caller talking through a terminal when the caller presses a particular button set on the terminal.

PTT is served in conjunction with instant messaging. For the PIT service, a terminal of a caller preregisters terminals to be involved in the PTT service in a server and displays the registered terminals on a screen of the terminal, as in a messenger that is an interactive online service, thereby enabling the caller to check whether the registered terminals can receive the PPT service.

In order to use the PTT service, the terminal of the caller first transmits a service request from the server. Upon receiving the service request, the server accepts or rejects the service request according to the preset policy (resource or authority). When the server accepts the service request, the server connects to each of the target terminals included in a group preregistered by the caller through the terminal. When the connection is completed, the terminal of the caller may transmit a voice message by pressing a particular button, and the target terminals included in the group may simultaneously receive the voice message transmitted through the terminal of the caller. When the caller terminates the transmission of the voice message, another target terminal in the group may become a caller and may transmit a voice message in the same manner.

PTT targets may be grouped generally by a caller designating users that satisfy a particular condition in a list of targets.

Further, there is a grouping method in which terminals are grouped based on the position of targets, for example, terminals located in a particular region are grouped, into one chat group and PTT is enabled between users located in the particular region. FIG. 1 illustrates an example of configuring a group of target terminals in a general group call service. Referring to FIG. 1, it is possible to set a circle having the radius of a maximum PTT service-enabling distance 100 from a reference point as a PTT-enabled area. In this case, a caller can perform PTT with terminals located in the PTT-enabled area, that is, a subscriber terminal 1 and a subscriber terminal 2.

FIG. 2 illustrates an example in which a new terminal enters the PTT-enabled area of FIG. 1.

Referring to FIG. 2, it is assumed that a subscriber terminal 4 102 enters the PTT-enabled area. Then, location information on the subscriber terminal 4 102 is transmitted to a server. The server stores in advance a subscriber list including PTT target terminals. The subscriber list may include terminals registered by a particular user as described above, or may include terminals deployed in a particular location as illustrated in FIG. 2. The subscriber list may further include location and state information on each terminal. Here, the state information is additional information indicating a working state of each terminal. When the server receives location information on the subscriber terminal 4 102, the server may, identify that the subscriber terminal 4 102 is located in the PTT-enabled area, may set the location information on the subscriber terminal 4 102 as the PTT-enabled area, and may store the location information in the subscriber list. Accordingly, the subscriber terminal 4 102 may receive a PTT service configured for the PTT-enabled area.

As described above, when a location-based PTT service is provided, the PTT service can be provided for all subscriber terminals located in the PTT-enabled area, but an unnecessary voice message may be transmitted to all the subscriber terminals. Further, since a voice message needs to be transmitted to all subscriber terminals located in the PTT-enabled area, network infrastructure is inefficiently used. In addition, the subscriber terminals included in the group may receive a plurality of unnecessary chat messages, so that users concentrate less on chatting. For example, when an emergency occurs to a caller, it is difficult for the caller to ask for help from or inquire of a target located near the caller.

SUMMARY

The present disclosure proposes a method of temporarily providing and releasing a PTT channel enabling real-time chatting between target terminals located in a short distance from the position of a terminal.

A method according to an embodiment of the present disclosure is a method for performing group communication by a terminal, the method including: setting a condition for selecting target terminals to perform group communication on the basis of a position of the terminal, and transmitting configuration information including the set condition to a server that provides the group communication; transmitting a request for the group communication to the server; receiving, from the server, a talk burst control message for group communication with selected terminals that satisfy the condition among adjacent terminals located in a short distance from the terminal; and relaying media data to the selected terminals via the server.

Another method according to another embodiment of the present disclosure is a method for performing group communication by a server, the method including: receiving, from a terminal, configuration information including a condition for selecting target terminals to perform group communication, which is set on the basis of a position of the terminal; configuring a temporary group for the group communication including selected terminals that satisfy the condition among adjacent terminals located in a short distance from the terminal; transmitting a talk burst control message for group communication to the terminal and each of the selected terminals upon receiving a request for the group communication from the terminal; and relaying media data, received from the terminal, to the selected terminals.

A device according to an embodiment of the present disclosure is a terminal for performing group communication, the terminal including: a controller configured to set a condition for selecting target terminals to perform group communication on the basis of a position of the terminal, and to control a transceiver to transmit configuration information including the set condition to a server that provides the group communication; and the transceiver configured to transmit a request for the group communication to the server, to receive, from the server, a talk burst control message for group communication with selected terminals that satisfy the condition among adjacent terminals located in a short distance from the terminal, and to relay media data to the selected terminals via the server.

Another device according to another embodiment of the present disclosure is a server for performing group communication, the server including: upon receiving, through a transceiver, from a terminal, configuration information including a condition for selecting target terminals to perform group communication, which is set on the basis of a position of the terminal, a controller configured to configure a temporary group for the group communication including selected terminals that satisfy the condition among adjacent terminals located in a short distance from the terminal; and the transceiver configured to transmit a talk burst control message for group communication to the terminal and each of the selected terminals upon receiving a request for the group communication from the terminal, and to relay media data, received from the terminal, to the selected terminals.

Other aspects, gains, and core features of the present disclosure are processed along with additional drawings, and they are apparent to those skilled in the art from the following detailed description including exemplary embodiments of the present disclosure.

The terms "include", "comprise", and derivatives thereof may mean inclusion without limitation, the term "or" may have an inclusive meaning and means "and/or", the phrases "associated with", "associated therewith", and derivatives thereof may mean to include, be included within, interconnect with, contain, be contained within, connected to or with, coupled to or with, be communicable with, cooperate with, interleave, juxtapose, be proximate to, be bound to or with, have, and have a property of, the term "controller" may mean any device, system, or a part thereof that controls at least one operation, and such a device may be implemented in hardware, firmware, or software, or some combinations of at least two of the same. It should be noted that the functionality associated with any particular processor may be centralized or distributed, whether locally or remotely. Definitions for certain words and phrases are provided throughout this patent document, those skilled in the art should understand that in many, if not most instances, such definitions apply to prior, as well as future uses of such defined words and phrases.

BRIEF DESCRIPTION OF DRAWINGS

The above and other aspects, features and advantages of the present disclosure will be more apparent from the following detailed description taken in conjunction with the accompanying drawings, in which.

DETAILED DESCRIPTION

Figure 1:
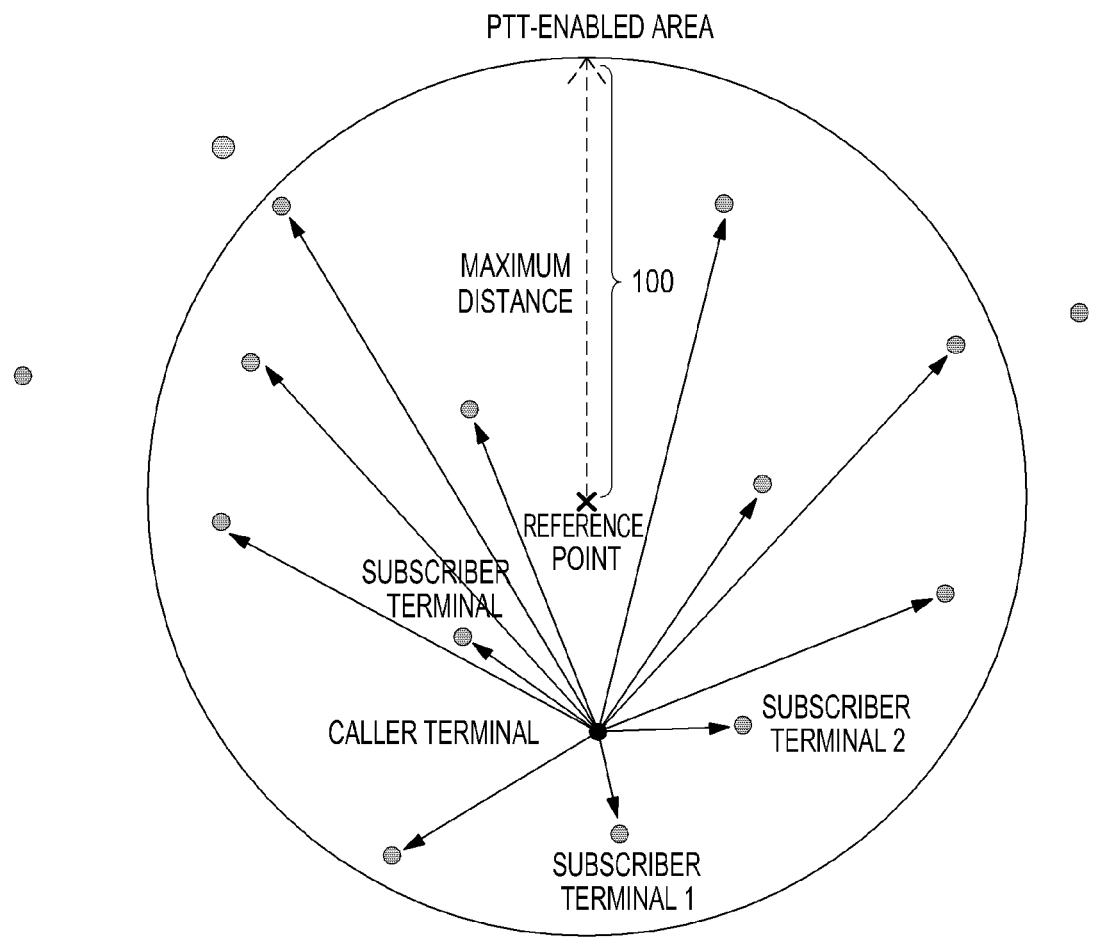
FIG. 1 illustrates an example of configuring a group of target terminals in a general group call service.
Figure 2:
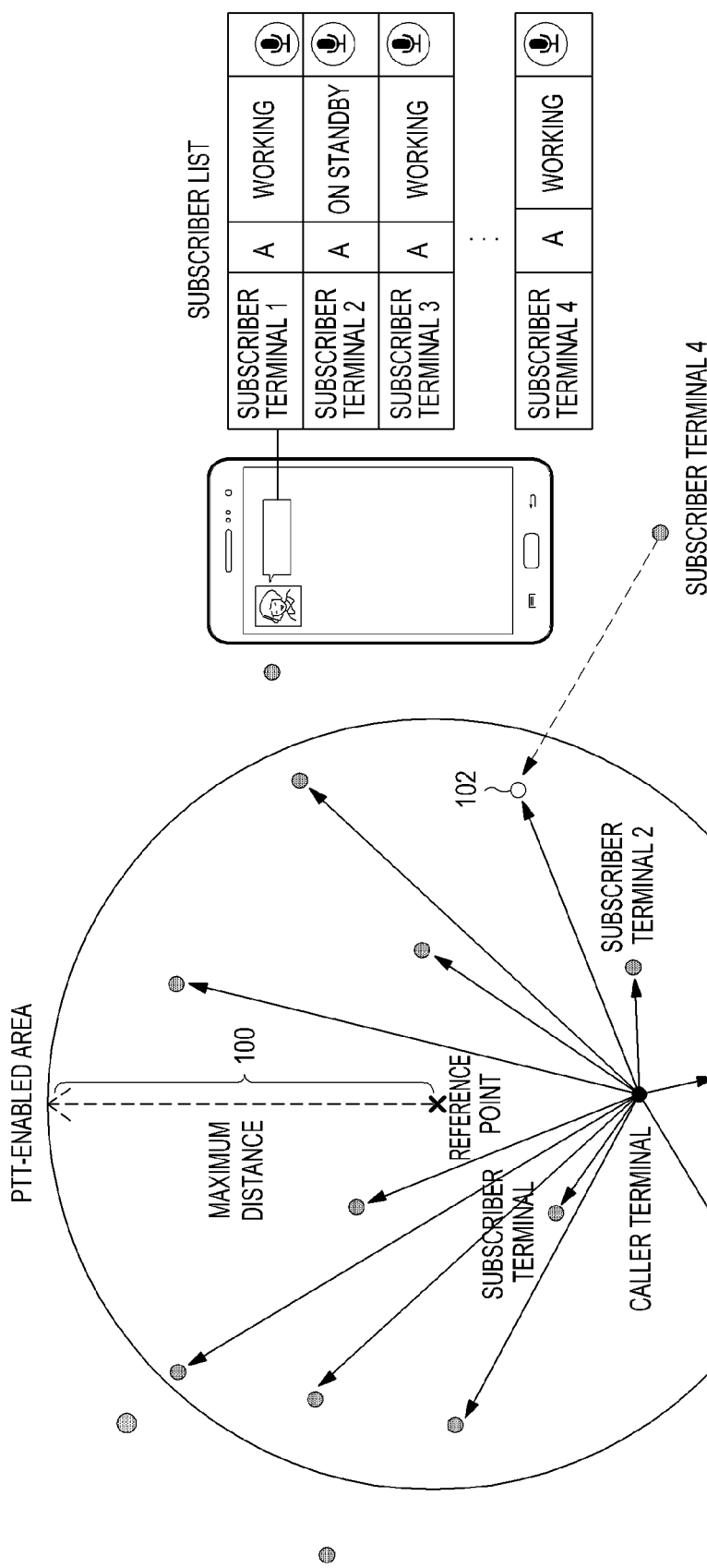
FIG. 2 illustrates an example in which a new terminal enters a PTT-enabled area of FIG. 1.

Hereinafter, operation principles of exemplary embodiments of the present disclosure will be described in detail with reference to accompanying drawings. Like reference numerals designate like components in the drawings where possible even though components are shown in different drawings. In the following description of the present disclosure, a detailed description of related known functions or configurations will be omitted so as not to obscure the subject of the present disclosure. The terms as described below are defined in consideration of the functions in the embodiments, and the meaning of the terms may vary according to the intention of a user or operator, convention, or the like. Therefore, the definitions of the terms should be made based on the contents throughout the specification.

The present disclosure may have various modifications and various embodiments, among which specific embodiments will now be described more fully with reference to the accompanying drawings. However, it should be understood that there is no intent to limit the present disclosure to the particular forms disclosed, but on the contrary, the present disclosure is to cover all modifications, equivalents, and alternatives falling within the spirit and scope of the disclosure.

Further, it will be appreciated that singular expressions such as "an" and "the" include plural expressions as well, unless the context clearly indicates otherwise. Accordingly, as an example, a "component surface" includes one or more component surfaces.

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more associated items.

The terms used herein are used only to describe particular embodiments, and are not intended to limit the present disclosure. As used herein, the singular forms are intended to include the plural forms as well, unless the context clearly indicates otherwise. In the present disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein, including technical and scientific terms, have the same meaning as those commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present specification.

According to various embodiments of the present disclosure, an electronic device may include a communication functionality. The terminal may, for example, be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, or a wearable device (e.g., Head-Mounted Device (HMD), electronic clothes, an electronic bracelet, an electronic necklace, an electronic appcessory, an electronic tattoo, or a smart watch).

According to various embodiments of the present disclosure, the electronic device may be a smart home appliance with a communication functionality. The smart home appliance may, for example, be a television, a Digital Video Disk (DVD) player, an audio player, a refrigerator, an air conditioner, a vacuum cleaner, an oven, a microwave, a washer, a drier, an air purifier, a set-top box, a TV box (e.g., Samsung HomeSync™, Apple TV™, or Google TV™), a gaming console, an electronic dictionary, a camcorder, or an electronic photo frame.

According to various embodiments of the present disclosure, the terminal may be a medical appliance (e.g., Magnetic Resonance Angiography (MRA) device, Magnetic Resonance Imaging (MRI) device, Computed Tomography (CT) device, and ultrasonic device), a navigation device, a Global Positioning System (GPS) receiver, an Event Data Recorder (EDR), a Flight Data Recorder (FDR), an automotive infotainment device, a marine electronic device (e.g., ship navigation device and a gyrocompass), avionics, security equipment, or an industrial or home robot.

According to various embodiments of the present disclosure, the electronic device may be a part of furniture or a building/structure, an electronic board, an electronic signature receiving device, a projector, and various kinds of measuring instruments (e.g., water meter, electric meter, gas meter, and electromagnetic wave meter), each of which has a communication functionality.

According to various embodiments of the present disclosure, the electronic device may be a combination of the above-mentioned devices. Further, it will be apparent to those skilled in the art that the terminal according to various embodiments of the present disclosure is not limited to the above-mentioned devices.

According to various embodiments of the present disclosure, a terminal capable of a PTT service may be, for example, an electronic device.

Hereinafter, a PTT service according to an embodiment of the present disclosure includes an embodiment provided through a server providing a PTT service and an embodiment provided based on direct communication between terminals, that is, Device-to-Device (D2D) communication.

Figure 3A:
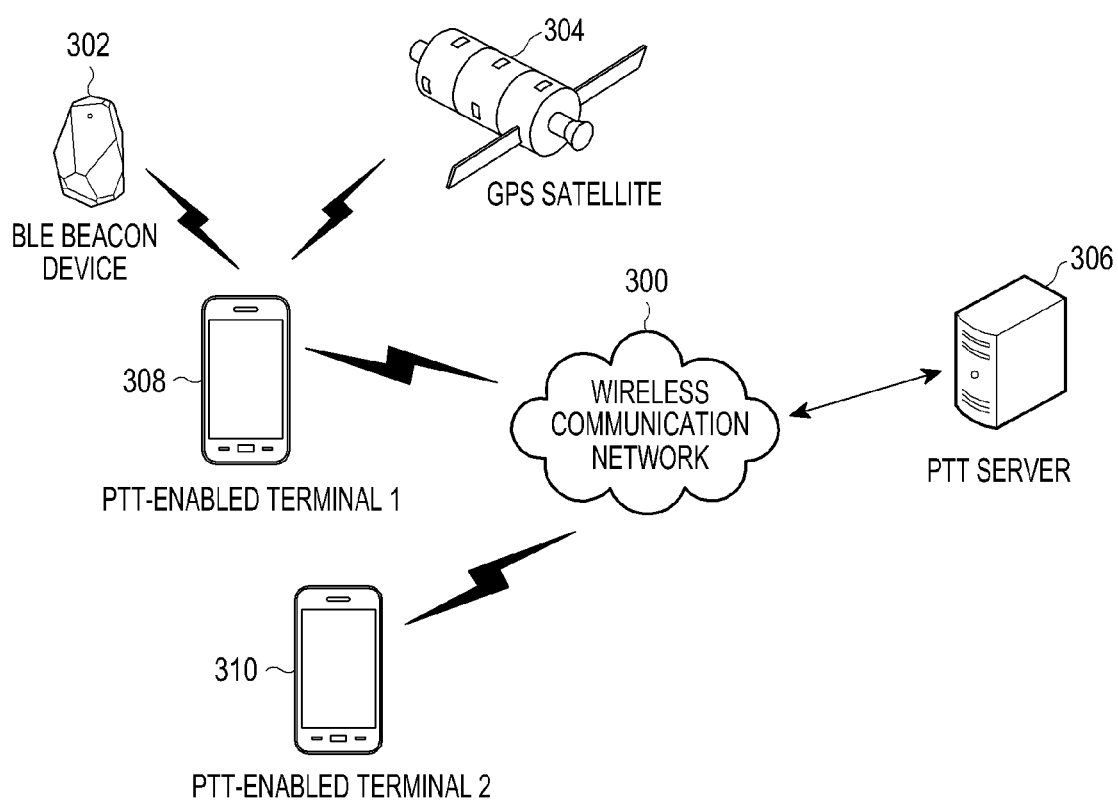
FIG. 3A illustrates an example of a communication system that provides a location-based PPT service according to an embodiment of the present disclosure.

FIG. 3A illustrates an example of a communication system that provides a location-based PPT service according to an embodiment of the present disclosure.

Referring to FIG. 3A, the communication system may include, for example, a wireless communication network 300, a Bluetooth Low Energy (BLE) beacon device 302, a Global Positioning System (GPS) satellite 304, a PTT server 306, and PTT-enabled terminals 1 and 2 308 and 310 that support a PTT service.

The GPS satellite 304 and the BLE beacon device 302 provide location information on terminals. The BLE beacon device 302 periodically generates a beacon signal when the BLE beacon device 302 detects that a terminal is within a signal range thereof. Accordingly, the PTT-enabled terminals 1 and 2 308 and 310 may update the location information from the GPS satellite 304 and the BLE beacon device 302.

Although not shown in the drawing, the PTT server 306 may interwork with a separate location-based service server, or may obtain state information or location information on each terminal from registered terminals and may store the information. The PTT server 306 may control a PPT-based group chat between the registered terminals, may receive the location information on each of the terminals, may update group information required by a corresponding terminal, and may provide the updated group information to the corresponding terminal. When receiving a condition for generating a PTT group set by a terminal of a caller, the PTT server 306 according to the embodiment of the present disclosure may select nearby terminals based on location information by interworking with the location-based service server that is not shown or by receiving the location information from the terminal, may configure a PTT group using terminals satisfying the condition among the selected terminals, and may transmit information on the configured PTT group to the terminal.

Figure 3B:
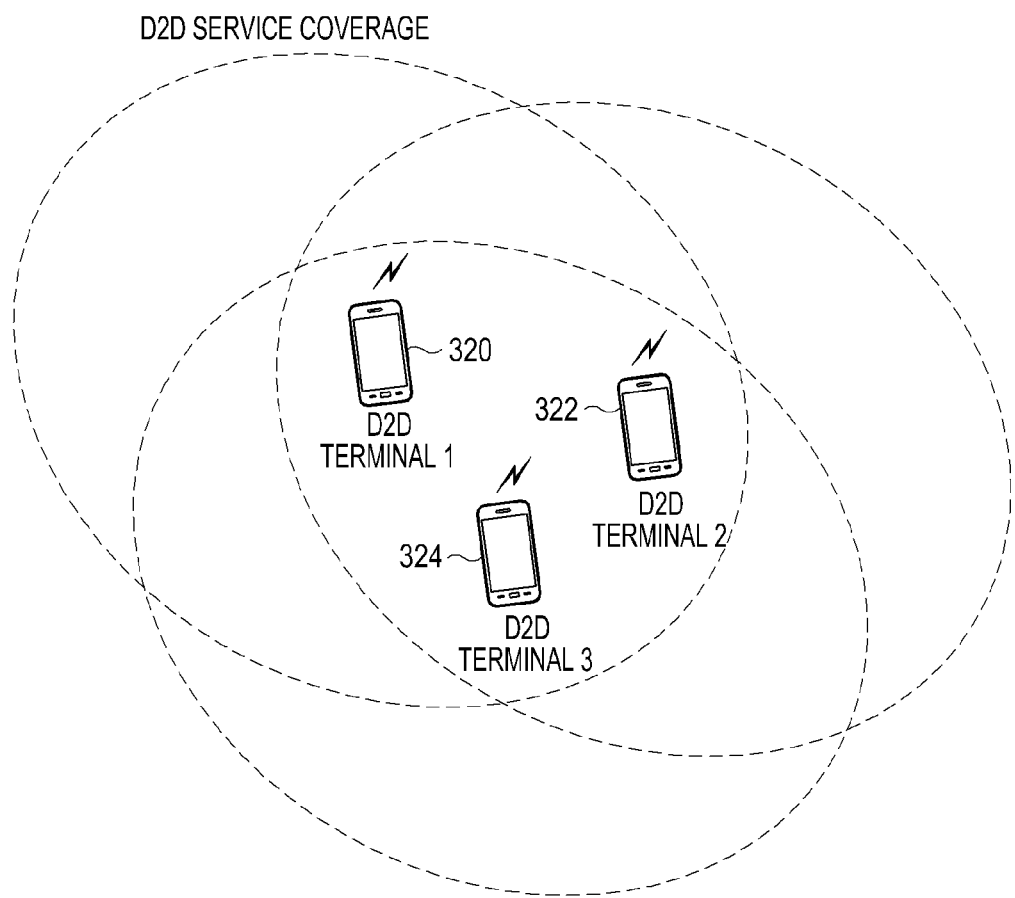
FIG. 3B illustrates an example of a D2D system that provides a location-based PPT service according to an embodiment of the present disclosure.

FIG. 3B illustrates an example of a D2D system that provides a location-based PPT service according to an embodiment of the present disclosure.

Referring to FIG. 3B, since a D2D-based PTT service is provided by direct communication between terminals, a separate server for providing a PTT service is not needed, unlike in FIG. 3A. For example, D2D terminal 1 320 to D2D terminal 3 324 that support direct communication between terminals are located within D2D service coverage, and each terminal may perform a PTT service according to the embodiment of the present disclosure. The operation of a terminal performing a D2D-based PTT service will be described in detail with reference to FIGS. 7A and 7B.

Hereinafter, in an embodiment of the present disclosure, a caller wishing to perform a PTT service may set a condition for selecting target terminals to perform PTT through a terminal of the caller on the basis of the position of the caller, may select and group terminals corresponding to the set condition into one group, and may use the PTT service along with the terminals in the group. That is, the terminal of caller may be configured to perform all operations performed by the PTT server of FIG. 3A.

Hereinafter, in an embodiment of the present disclosure, a terminal corresponding to a caller wishing to perform a PTT service may configure a PTT group according to a predetermined situation on the basis of the position thereof. Specifically, the terminal according to the embodiment of the present disclosure may be used for a vertical area in a particular place, for example, a hotel, a cruise ship, a large-scale mart, a hospital, a theater, and the like. When organizing a hotel room, a staff member can ask for help from a nearby colleague through location-based PTT group setup according to the embodiment of the present disclosure. Further, when a customer asks a clerk about an item that the customer wants in a shop, the clerk may ask colleagues or ask for help from the colleagues through location-based PTT group setup according to the embodiment of the present disclosure. Further, in the occurrence of an emergency occurs, it is also possible to report the situation to nearby colleagues and to ask for help through PTT group setup according to the embodiment of the present disclosure. For example, when a patient falls into a critical condition in a hospital, a nurse can inform the nearby medical staff. Also, for the patient, a worn wristband can automatically transmit an emergency voice message to the nearby medical staff for help. Therefore, in the PTT group according to the embodiment of the present disclosure, a user may set, as a short distance, a predetermined distance from the position thereof in consideration of the situation or position thereof, may set a temporary PTT group on the basis of the predetermined distance, and may perform desired PTT communication. Accordingly, it is possible to save network infrastructure resources, compared to conventionally configured PTT communication performed in the entire PTT-enabled area set, and to cope with a plurality of situations that may occur in the same area.

Figure 4:
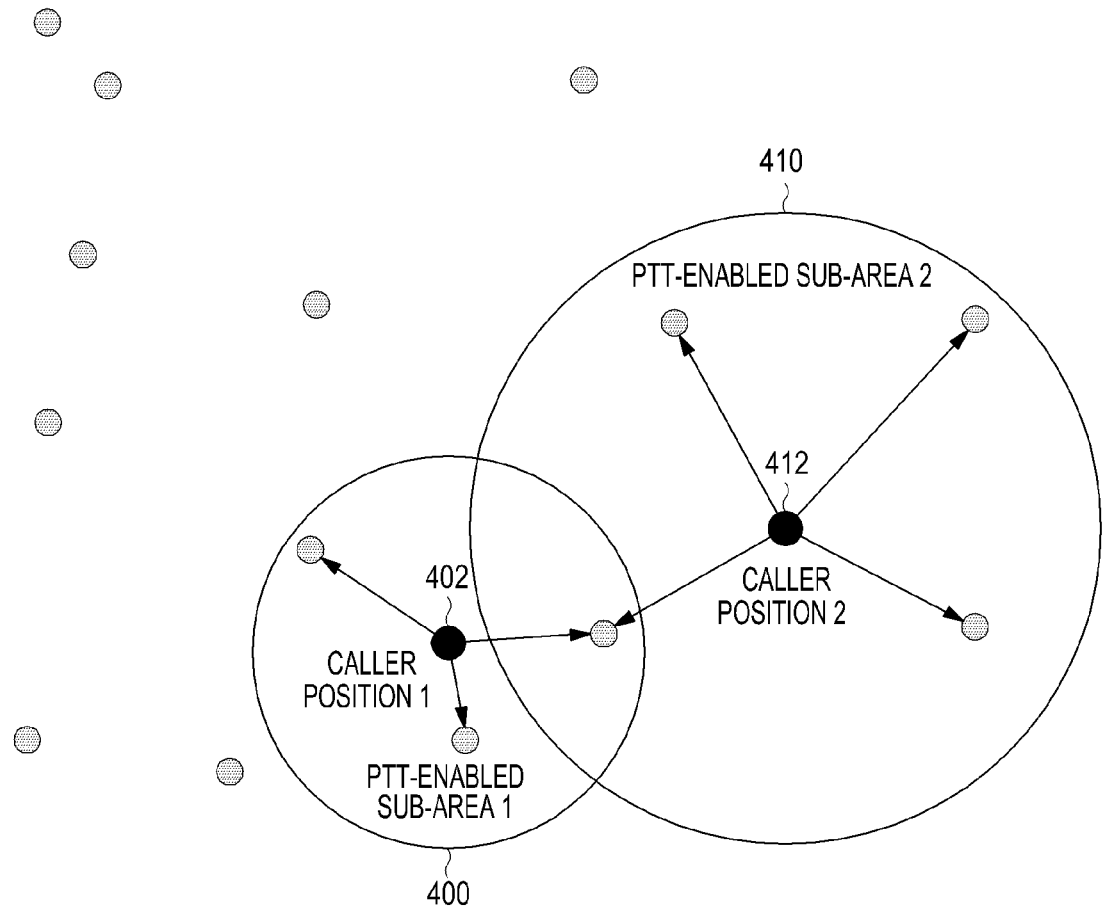
FIG. 4 illustrates an example of configuring a PPT group of target terminals located in a short distance from the position of a caller according to an embodiment of the present disclosure.

FIG. 4 illustrates an example of configuring a PPT group of target terminals located in a short distance from the position of a caller according to an embodiment of the present disclosure.

Referring to FIG. 4, terminals located in a PTT-enabled sub-area 400 corresponding to a circle having the radius of a predetermined distance from a position 1 402 of a caller may be determined as a PTT group. Likewise, when the caller moves to a position 2 412, terminals located in a PTT-enabled sub-area 410 corresponding to a circle having the radius of a predetermined distance from the position 2 412 may be determined as another PTT group. As illustrated in FIG. 4, the PTT-enabled sub-area 400 and the PTT-enabled sub-area 410 may be set as different coverage depending on the situation in which the caller needs PTT communication. Then, the caller may have a group chat needed in a short distance, for example, for a help request, a query, and a risk notification, with the PTT groups configured on the basis of the position thereof. In the embodiment of the present disclosure, the PTT groups configured on the basis of the position of the caller may be temporarily created and may be released for a particular situation.

Figure 5:
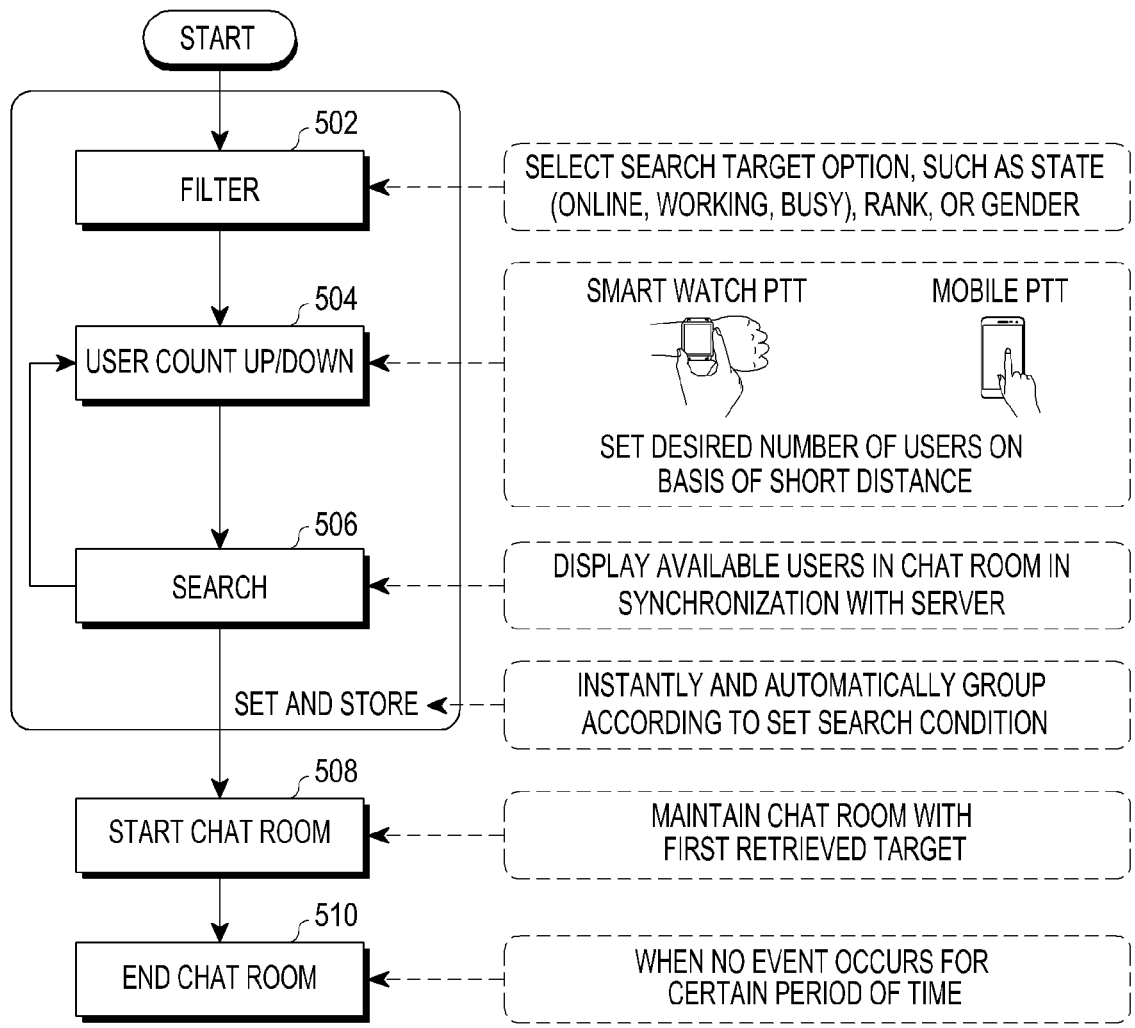
FIG. 5 is a flowchart illustrating an operation of generating and releasing a PTT group according to an embodiment of the present disclosure.

FIG. 5 is a flowchart illustrating an operation of generating and releasing a PTT group according to an embodiment of the present disclosure.

A terminal according to the embodiment of the present disclosure may generate a PTT group satisfying at least one condition. Specifically, in operation 502, the terminal may primarily filter target terminals for the PTT group using the present status of a user supported by a PTT system. For example, terminals with the present terminal status set to 'busy', 'in a meeting', or 'occupied' may be excluded from the target terminals for the PPT group, thereby finding target terminals that can directly participate in a group chat. Alternatively, the rank or gender of target terminals may be additionally set as a filtering condition according to the embodiment.

In operation 504, the terminal may set the number of target terminals to be included in a PTT group among terminals located within a preset short distance based on the position of the terminal. In this case, according to an embodiment, in operation 506, a PTT server or a D2D communication terminal may monitor the terminals located in the short distance and may configure and store a PTT group including a number of terminals corresponding to the set number among the monitored terminals. Then, a screen of the terminal may display that the terminals included in the stored PTT group are ready for a PTT service. Accordingly, the terminal becomes ready for an immediate group chat with the set PTT group.

According to the embodiment of the present disclosure, when the activation of a PTT service is detected, the PTT server or the D2D terminal fixes the target terminals in the PTT group, which has been updated according to the preset filtering condition or the number of users as described above in operations 502 to 506, and generates a temporary chat room in operation 508. In operation 510, when it is identified that a user event, such as Voice Auto Detection (VAD), does not occur for a predetermined period of time in the temporary chat room or that the position of the caller is changed, the PTT server or the D2D terminal may release the temporary chat room.

Figure 6:
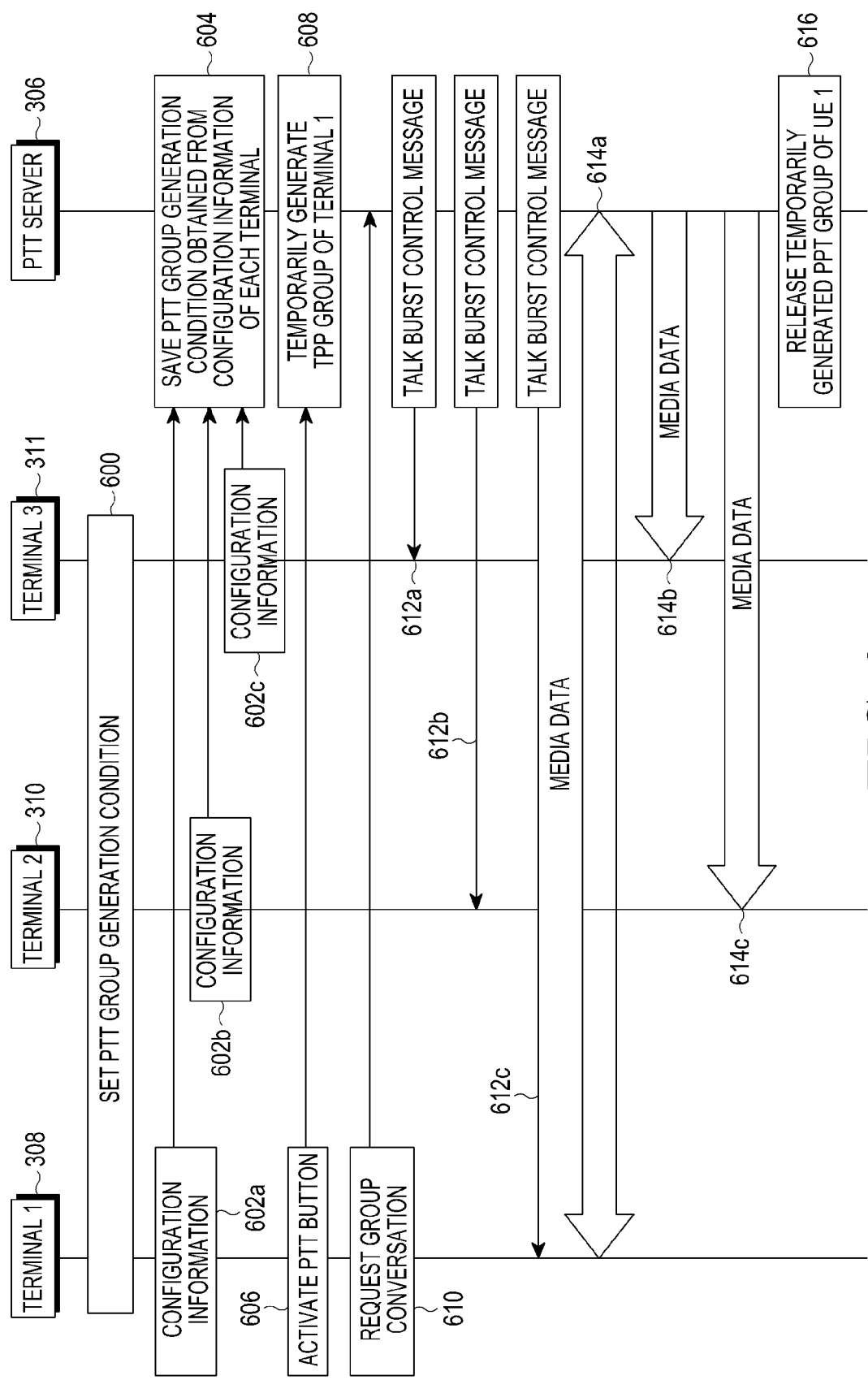
FIG. 6 is a flowchart illustrating an operation for a PTT service in the communication system of FIG. 3A.

FIG. 6 is a flowchart illustrating an operation for a PTT service in the communication system of FIG. 3A.

Referring to FIG. 6, in operation 600, each of a terminal 1 308 to a terminal N 311, which support a PTT service, sets a PTT group generation condition and generates the PTT group generation condition as configuration information. Here, the PTT group generation condition may include a filtering condition set to at least one of a present status, a rank, and the position of a corresponding terminal, and may include the number of target terminals forming a PTT group satisfying the condition. In operations 602*a* to 602*c*, each of the terminal 1 308 to the terminal N 311 transmits the generated configuration information to a PTT server 306. The terminal 1 308 to the terminal N 311 and the PTT server 306 according to the embodiment of the present disclosure may transmit and receive information using a unicast communication method. In operation 604, the PTT server 306 stores the PTT group generation and search condition acquired from the configuration information received from each terminal.

It is assumed that the user of the terminal 1 308 activates a PTT button of the terminal 1 308 in operation 606. When it is detected that the PTT button of the terminal 1 308 is activated, the PTT server 306 may identify the PTT group generation condition stored for the terminal 1 308 and may temporarily generate a PPT group corresponding to the identified PTT group generation condition in operation 608.

In operation 610, the terminal 1 308 transmits a request for a group chat in the PTT group to the PTT server 306. In operations 612*a* to 612*c*, the PTT server 306 may transmit, for a group call, a talk burst control message, such as a Taken message or Granted message, to a target terminal included in the temporarily generated group corresponding to the PTT group generation condition of the terminal 1 308, for example, the terminal 2 310 and the terminal N 311.

In operation 614*a*, the terminal 1 308 transmits media data to the PTT server 306. In operations 614*b* and 614*c*, the PTT server 306 relays the media data to the terminal 2 310 and the terminal N 311.

Subsequently, when no media data is received from the terminal 1 308 having requested the group call for a certain period of time or it is detected that the position is changed outside a certain range due to movement from the position where the first group call is requested, the PTT server 306 may release the temporarily generated group in operation 616.

Figure 7A:
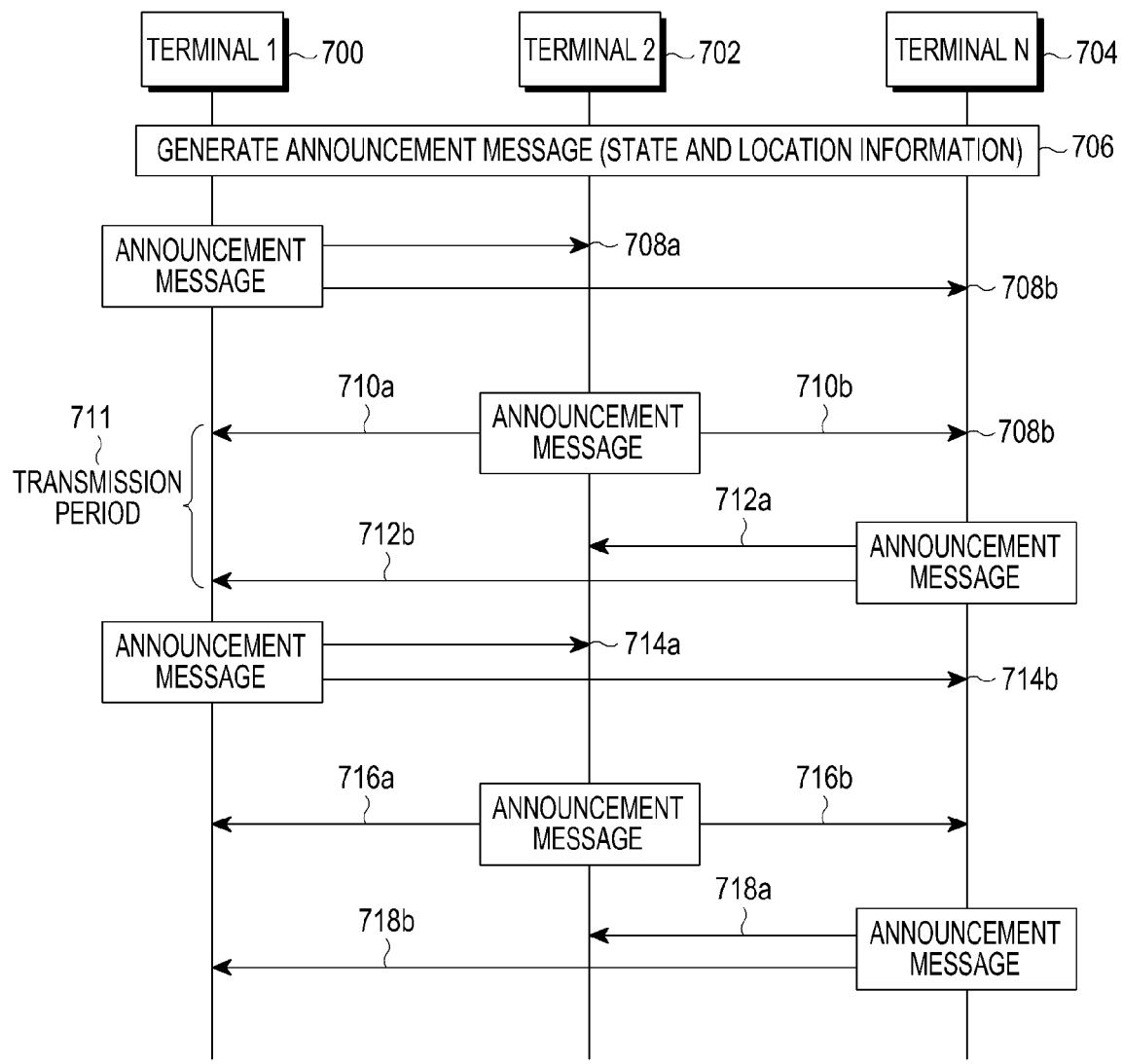
FIG. 7A is a flowchart illustrating an operation of sharing information between terminals for a D2D-based PTT service according to an embodiment of the present disclosure.

FIG. 7A is a flowchart illustrating an operation of sharing information between terminals for a D2D-based PTT service according to an embodiment of the present disclosure. Herein, it is assumed that a terminal 1 700 to a terminal N 704 support a D2D-based PTT service.

Referring to FIG. 7A, in operation 706, each of the terminal 1 700, the terminal 2 702, and the terminal N 704 generates an announcement message including state and location information thereof. The terminal 1 700, the terminal 2 702, and the terminal N 704 periodically transmit the announcement message. Although a unicast method may be used as a communication method for information exchange to transmit the announcement message one to one, this method is inefficient for a one-to-many call over PTT communication. Therefore, in the embodiment of the present disclosure, it is assumed that the announcement message is directly transmitted to a counterpart terminal using a multicast or broadcast communication method. In the embodiment of the present disclosure, for the efficient use of D2D network resources, a period for transmitting the announcement message may be set, thereby adjusting the extent to which the transmission of the announcement message takes up in the entire network bandwidth.

Specifically, the terminal 1 700 transmits an announcement message to the terminal 2 702 and the terminal N 704 in operations 708*a* and 708*b*. The terminal 2 702 also transmits an announcement message to the terminal 1 700 and the terminal N 704 in operations 710*a* and 710*b*. Then, the terminal N 704 transmits an announcement message in a preset transmission period 711 in operations 712*a* and 712*b*. Similarly, according to the preset period, the terminal 1 700 transmits the announcement message in operations 714*a* and 714*b*, and the terminal 2 702 transmits the announcement message in operations 716*a*, and 716*b*. Also, when the preset period of time comes, the terminal N 704 transmits the announcement message in operations 718*a* and 718*b*.

Accordingly, the terminals share the state and location information with each other and thus do not need to acquire additional information for generating a PTT group from a PTT server.

Figure 7B:
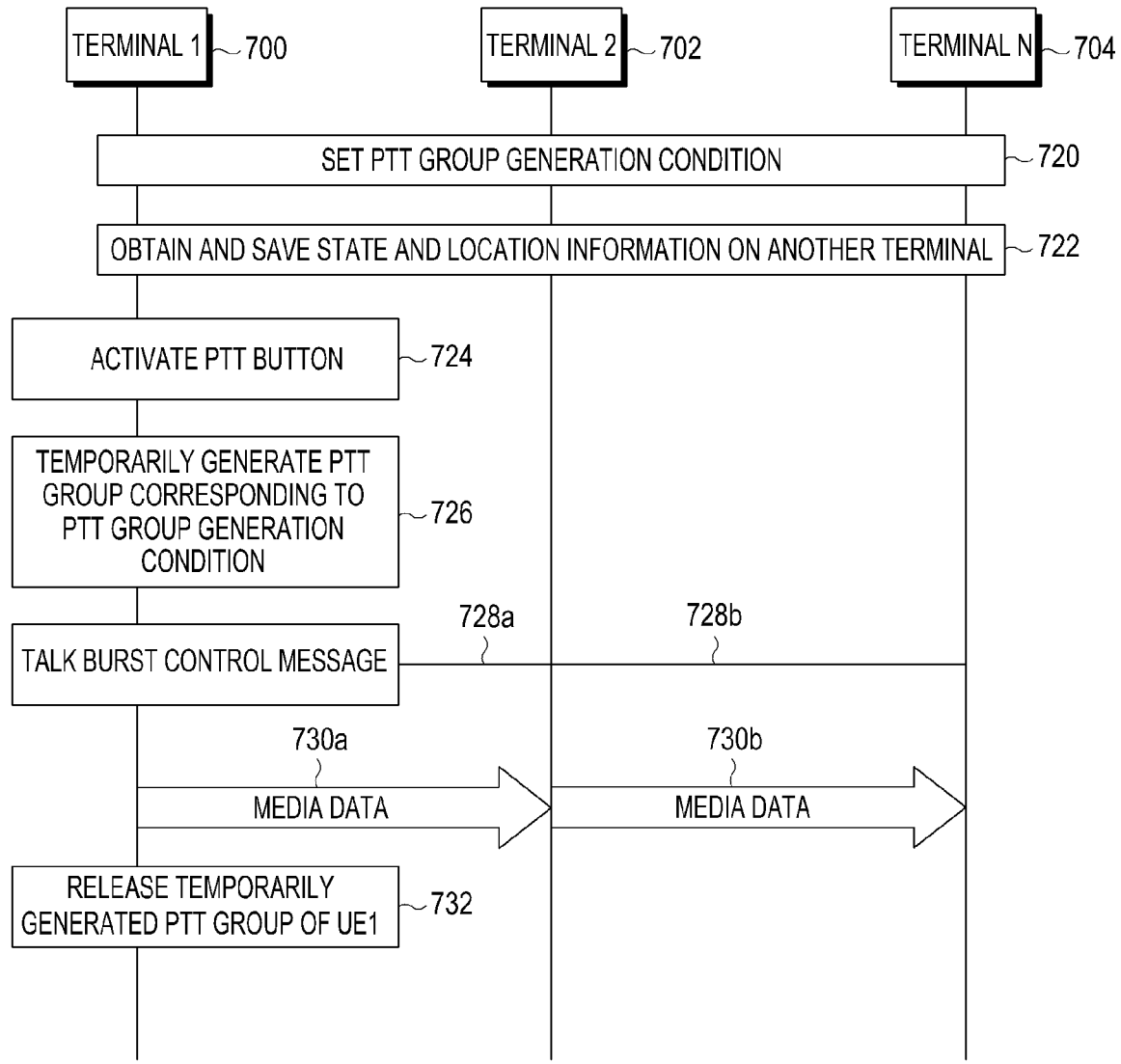
FIG. 7B is a flowchart illustrating an operation of generating and releasing a temporary group for the D2D-based PTT service of FIG. 7A.

FIG. 7B is a flowchart illustrating an operation of generating and releasing a temporary group for the D2D-based PTT service of FIG. 7A.

Referring to FIG. 7B, each of a terminal 1 700 to a terminal N 704 sets a PTT group generation condition and generates the PTT group generation condition as configuration information. Here, the PTT group generation condition may include a filtering condition set to at least one of a present status, a rank, and the position of a corresponding terminal, and may include the number of target terminals forming a PTT group satisfying the condition. The PTT group generation condition of each terminal is managed by the corresponding terminal.

In operation 722, each terminal acquires and stores state and location information on another terminal on the basis of announcement messages acquired from the other terminals in order to select a target terminal for a PTT group.

In operation 724, it is assumed that the terminal 1 700 activates a PTT button. In operation 726, the terminal 2 700 temporarily generates a PTT group of terminals corresponding to the PTT group generation condition set by the terminal 1 700 in operation 720. In operations 728*a* and 728*b*, the terminal 1 700 may transmit, for a group call, a talk burst control message to the target terminals of the temporarily generated PTT group. In operations 730*a* and 730*b*, the terminal 1 700 transmits media data to the target terminals of the temporarily generated PTT group. The media data is transmitted to the target terminals by a multicast or broadcast communication method.

When no media information is transmitted for a certain period of time or the position is changed outside a certain range due to movement from the position where the first group call is requested, the terminal 1 700 may release the temporarily generated group in operation 732.

Figure 8:
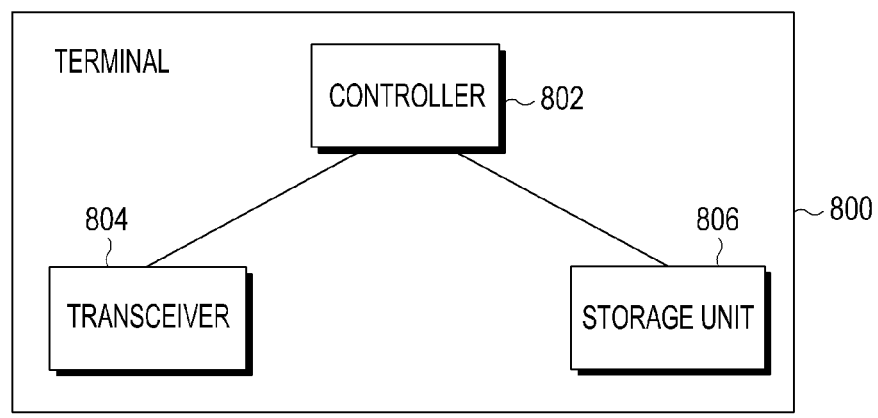
FIG. 8 is a diagram illustrating the configuration of a terminal according to an embodiment of the present disclosure.

FIG. 8 is a diagram illustrating the configuration of a terminal according to an embodiment of the present disclosure. Here, individual components of the terminal are illustrated as an example for convenience of description and may be subdivided into sub-units or integrated into one unit depending on the intent of an operator or the embodiment.

Referring to FIG. 8, the terminal 800 includes a controller 802, a transceiver 804, and a storage unit 806.

The controller 802 accesses a GPS or an adjacent BLE beacon device capable of providing location information on the terminal 800, updates the location information, and stores the updated location information in the storage unit 806.

Upon detecting a situation in which PTT communication is required, the controller 802 sets a predetermined short distance based on the current position of the terminal on the basis of the current situation, and sets a condition for selecting PTT target terminals in the short distance. Here, as mentioned above, the condition includes state and location information on a corresponding terminal.

In an embodiment, when the terminal 800 is a D2D-based device, the controller 802 temporarily generates a PTT group corresponding to the condition. In this case, as described in FIG. 7A, the controller 802 periodically exchanges state information and location information with other terminals through the transceiver 804 before generating the PTT group.

In an embodiment, when the controller 802 interworks with a PTT server, the controller 802 controls the transceiver 804 to transmit the set condition to the PTT server. The controller 802 may receive information on the PTT group temporarily generated corresponding to the condition from the PTT server through the transceiver 804.

Subsequently, the controller 802 performs PTT communication through the transceiver 804. According to an embodiment, when the terminal 800 is a D2D-based device, if no media information is transmitted for a certain period of time or the position is changed outside a certain range due to movement from the position where the first group call is requested, the controller 802 may release the temporarily generated PTT group. Alternatively, according to an embodiment, when no media information is transmitted for a certain period of time or the position is changed outside a certain range due to movement from the position where the first group call is requested, the controller 802 may receive a request to release the PTT group through the PTT server and may release the PTT group.

Although not shown in the drawings, a server according to an embodiment of the present disclosure may also include a transceiver and a controller. According to the foregoing embodiment of FIG. 6, the transceiver of the server may receive configuration information from each terminal. The controller may generate a temporary group including terminals corresponding to the configuration information, and may control the transceiver to transmit a talk burst control message to each terminal included in the generated temporary group, as in operations 612a to 612c, upon detecting the reception of a group chat request from the terminal 1 308. Subsequently, when receiving media data from the terminal 1 308, the controller may relay the media data to other terminals included in the temporary group, that is, the terminal 2 310 and the terminal 3 311.

Particular aspects of the present disclosure may be implemented as a computer-readable code in a computer-readable recording medium. The computer-readable recording medium is a predetermined data storage device which can store data which can be read by a computer system. Examples of the computer readable recording medium may include a read-only memory (ROM), a random access memory (RAM), a CD-ROM, a magnetic tape, a floppy disk, an optical data storage device, and a carrier wave (such as data transmission through the Internet). The computer-readable recording medium may be distributed through computer systems connected to the network, and accordingly the computer-readable code is stored and executed in a distributed manner. Further, functional programs, codes, and code segments to achieve the present disclosure may be easily interpreted by programmers skilled in the art.

It will be understood that a method and apparatus according to an embodiment of the present disclosure may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It will also be understood that a method and apparatus according to an embodiment of the present disclosure may be implemented by a computer or portable terminal including a controller and a memory, and the memory is an example of a machine readable device adapted to store a program or programs including instructions for implementing embodiments of the present disclosure.

Accordingly, the present disclosure includes a program including a code for implementing the apparatus or method described in any of the appended claims of the specification and a machine (computer or the like) readable storage medium for storing the program. Further, the program may be electronically carried by any medium such as a communication signal transferred through a wired or wireless connection, and the present disclosure appropriately includes equivalents thereof.

Further, an apparatus according to an embodiment of the present disclosure may receive the program from a program providing device that is wiredly or wirelessly connected thereto, and may store the program. The program providing device may include a program including instructions through which a program processing device performs a preset content protecting method, a memory for storing information and the like required for the content protecting method, a communication unit for performing wired or wireless communication with the program processing device, and a controller for transmitting the corresponding program to a transceiver at the request of the program processing device or automatically.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the aforementioned embodiments, but should be defined by the appended claims and equivalents thereof.

The invention claimed is:

1. A method for performing group communication by a terminal, the method comprising:

setting, by the terminal, a selection condition for target terminals to perform group communication based on a position of the terminal and transmitting, by the terminal, configuration information comprising the selection condition to a server that provides the group communication;

transmitting, by the terminal, a request for the group communication to the server after transmitting the configuration information comprising the selection condition;

receiving, from the server by the terminal, a control message for group communication with selected terminals, located in a predetermined distance from the terminal, that satisfy the selection condition; and transmitting, by the terminal, media data to the selected terminals via the server, wherein a group for the group communication is released when the position of the terminal is changed by a threshold value or greater, or an action for the group communication does not occur for a predetermined time, wherein the position of the terminal is a position corresponding to a time when the terminal activates the group communication, and wherein the setting of the selection condition comprises:

receiving announcement messages from adjacent terminals, each of the announcement messages comprising state information indicating whether or not a user of an adjacent terminal is busy or occupied and location information of the adjacent terminal;

obtaining state information and location information of each of the adjacent terminals from the received announcement messages; and setting the selection condition based on the state information and the location information.

2. The method of claim 1, wherein the action comprises transmitting, by the terminal, a voice message or media data for the group communication.

3. A terminal for performing group communication, the terminal comprising:

a transceiver; and a controller configured to:

set a selection condition for target terminals to perform group communication based on a position of the terminal, control the transceiver to transmit configuration information comprising the selection condition to a server that provides the group communication, control the transceiver to transmit a request for the group communication to the server after transmitting the configuration information comprising the selection condition, receive, from the server through the transceiver, a control message for group communication with selected terminals, located in a predetermined distance from the terminal, that satisfy the selection condition, and control the transceiver to transmit media data to the selected terminals via the server, wherein a group for the group communication is released when the position of the terminal is changed by a threshold value or greater, or an action for the group communication does not occur for a predetermined time, wherein the position of the terminal is a position corresponding to a time when the terminal activates the group communication, and wherein the controller is further configured to:

receive, through the transceiver, announcement messages from adjacent terminals, each of the announcement messages comprising state information indicating whether or not a user of an adjacent terminal is busy or occupied and location information of the adjacent terminal, obtain state information and location information of each of the adjacent terminals from the received announcement messages, and set the selection condition for the target terminals based on the state information and the location information.

4. The terminal of claim 3, wherein the action comprises transmitting, by the terminal, a voice message or media data for the group communication.

* * * * *